(12) United States Patent
Breynaert et al.

(10) Patent No.: US 9,246,525 B2
(45) Date of Patent: Jan. 26, 2016

(54) DEVICE AND METHOD FOR PREDISTORTION

(71) Applicant: NEWTEC CY, Sint-Niklaas (BE)

(72) Inventors: Dirk Breynaert, Sint-Niklaas (BE); Dieter Duyck, Leuven (BE); Frederik Simoens, Oosterzele (BE)

(73) Assignee: NEWTEC CY, Sint-Niklaas (BE)

( * ) Notice: Subject to any disclaimer, the term of this patent is extended or adjusted under 35 U.S.C. 154(b) by 0 days.

(21) Appl. No.: 14/642,893

(22) Filed: Mar. 10, 2015

(65) Prior Publication Data

US 2015/0270856 A1   Sep. 24, 2015

(30) Foreign Application Priority Data

Mar. 19, 2014   (NL) ...................... 2012479

(51) Int. Cl.
| | |
|---|---|
| *H04L 25/49* | (2006.01) |
| *H04B 1/04* | (2006.01) |
| *H04L 25/03* | (2006.01) |
| *H04L 27/34* | (2006.01) |
| *H04L 27/36* | (2006.01) |
| *H04B 7/185* | (2006.01) |

(52) U.S. Cl.
CPC .......... *H04B 1/0475* (2013.01); *H04B 7/18515* (2013.01); *H04L 25/03834* (2013.01); *H04L 27/3488* (2013.01); *H04L 27/368* (2013.01)

(58) Field of Classification Search
CPC ............. H04B 1/0475; H04B 7/18515; H04L 25/03834; H04L 27/368; H04L 27/3488
See application file for complete search history.

(56) References Cited

U.S. PATENT DOCUMENTS

| | | | | |
|---|---|---|---|---|
| 5,818,653 | A * | 10/1998 | Park et al. ........................ 360/32 |
| 6,963,624 | B1 | 11/2005 | He | |
| 2003/0179830 | A1 * | 9/2003 | Eidson ................. H04B 1/0475 375/296 |
| 2007/0190952 | A1 * | 8/2007 | Waheed ............... H04B 1/0475 455/114.3 |

(Continued)

FOREIGN PATENT DOCUMENTS

| | | |
|---|---|---|
| WO | 02/073920 A1 | 9/2002 |
| WO | 2013/012912 A1 | 1/2013 |
| WO | 2014/122080 A1 | 8/2014 |

OTHER PUBLICATIONS

Netherlands Search Report from Application No. NL 2012479, Nov. 6, 2014.

(Continued)

*Primary Examiner* — Syed Haider
(74) *Attorney, Agent, or Firm* — Workman Nydegger

(57) ABSTRACT

A device for predistortion and pulse shaping filtering in a communication system includes input scaling means arranged for scaling an applied transmit symbol with an adaptable input gain scaling factor, and a pulse shaping filter and a predistortion unit arranged for applying on the input gain scaled transmit symbol in either order a filtering operation and a non-linear predistortion operation to obtain a predistorted signal. The non-linear predistortion operation is represented by a set of parameter values selectable among a plurality of given sets of parameter values. The predistortion unit is arranged for selecting the set of parameter values exploiting a given performance measure. The device includes output scaling means arranged for scaling the predistorted signal with an output gain scaling factor to obtain a transmit signal. The adaptable input gain scaling factor and the output gain scaling factor are precalculated values corresponding to the selected set of parameter values.

12 Claims, 8 Drawing Sheets

(56) References Cited

U.S. PATENT DOCUMENTS

2011/0025414 A1* 2/2011 Wolf et al. .................... 330/149
2012/0034887 A1* 2/2012 McCallister .......... H03F 1/3247
　　　　　　　　　　　　　　　　　　　　　　　　　455/127.1

OTHER PUBLICATIONS

Alvarez-Diaz, Marcos, et al., "Joint Precoding and Predistortion Techniques for Satellite Telecommunication Systems", 2nd International Symposium on Wireless Communication Systems, Sep. 2005, IEEE, pp. 688-692.

Benedetto, S., et al., "Modeling and Performance Evaluation of Nonlinear Satellite Links—A Volterra Series Approach", IEEE Transactions on Aerospace and Electronic Systems, vol. AES-15, No. 4, Jul. 1979, pp. 494-507.

Berdondini, M., et al., "Adaptive Fractional Predistortion Techniques for Satellite Systems based on Neural Networks and Tables", Vehicular Technology Conference, 2007, VTC2007-Spring IEEE 65th, Apr. 2007, pp. 1400-1404.

Biglieri, Ezio et al., "Adaptive Cancellation of Nonlinear Intersymbol Interference for Voiceband Data Transmission", IEEE Journal on Selected Areas in Communications, vol. SAC-2, No. 5, Sep. 1984, pp. 765-777.

"Digital Video Broadcasting (DVB); Second Generation Framing Structure, Channel Coding and Modulation Systems for Broadcasting, Interactive Services, News Gathering and Other Broadband Satellite Applications (DVB-S2)", ETSI EN 302 307 V1.2.1, (Aug. 2009), European Standard (Telecommunications Series), 78 pages.

Kayhan, Farbod, et al., "Constellation Design for Transmission over Nonlinear Satellite Channels", Global Communications Conference (GLOBECOM), IEEE, Dec. 2012, pp. 3401-3406.

* cited by examiner

DEVICE AND METHOD FOR PREDISTORTION

FIELD OF THE INVENTION

The present invention is generally related to the field of techniques for reducing signal distortion in a digital communication system. More in particular, it relates to techniques for predistorting a modulated signal.

BACKGROUND OF THE INVENTION

The present invention is concerned with predistorting a modulated signal prior to its transmission over a wired or wireless channel in such a way that the distortion incurred by the signal from the channel is reduced. An example of such a channel is a satellite communication channel. Note that in satellite communications a performance gain of 0.1 dB (e.g. obtained by predistortion) is valued to be quite large because of the large cost of producing, launching and maintaining a satellite. Optimal satellite resources exploitation requires transmitting a signal that uses the satellite amplifier at or close to its saturation point. This is typically the case in single-carrier per transponder scenarios where the transponder operates in ALC (automated level control) mode in order to keep the satellite amplifier at or close to its saturation point. When amplified close to saturation, the transmitted signal typically incurs distortion from the non-linear behaviour of the satellite amplifier, thus reducing the reliability of the communication.

The transmitter output in a digital communication system, particularly a satellite communication system, can be seen as a transmit signal which is a pulse train modulated by a sequence of complex symbols. This modulation is typically performed by applying the symbols to a pulse shaping filter (PSF). Each symbol is selected (referred to as mapping) from an allowed set of complex values, represented by an in-phase and quadrature component (I and Q, respectively). The set of possible symbols is called a constellation. Several mapping strategies can be envisaged in satellite communications, including quadrature amplitude modulation (QAM), phase shift keying (PSK) and amplitude and phase shift keying (APSK). These mapping strategies employ different types of constellations. For example, in the APSK mapping scheme the constellation points are located on two or more concentric rings. The combination of a constellation and a forward error correcting code (FEC) is referred to as a modulation and coding or a modcod. As different prior art documents often use other notations to denote the same physical entity, the notation is explicitly recalled in this document. The complex (I,Q) values provided to the PSF are referred to as transmit symbols. These symbols may or may not be predistorted by a symbol predistorter. The PSF output is a complex signal and can be applied to a signal predistorter or not. The output of the PSF (and possibly the signal predistorter) is denoted as the transmit signal.

The above digital communication system is a single-carrier communication system. The extension to a multi-carrier communication system where all carriers are transmitted from one device is trivial. Typically, more than one pulse shaping filter is used. After the combination of all carriers, a signal predistorter can possibly be applied.

An important feature in satellite communications is adaptive code and modulation (ACM), see ETSI EN 302 307 v1.2.1: Second generation framing structure, channel coding and modulation systems for Broadcasting, Interactive Services, News Gathering and other broadband satellite applications. In the remainder of this document this reference is referred to as the DVB-S2 standard. In ACM the modcod can dynamically change on a per-frame basis, based on the channel quality, i.e., the link budget. That is, given a change in the link margin (e.g. due to fading), another modcod is chosen such that the link margin is again similar as before. For example, in one frame 8-PSK with FEC coding rate 2/3 can be used and in the next frame 16APSK with FEC coding rate 2/3. Another important mode in satellite communications is constant code and modulation (CCM). In CCM the chosen modcod is fixed and cannot change. Thus, sufficient link margin is taken to accommodate for fading (e.g. due to rain) without losing frames. CCM is typically applied for TV signal broadcasting.

In FIG. 1 a satellite communication link with its main components is shown as an example of a transmission link. In this example structure the complex transmit signal (which is typically obtained after a PSF or after a predistortion block following the PSF) is I/Q modulated onto a carrier waveform. Before transmission, the carrier waveform is amplified by the ground station high power amplifier (HPA). The signal is received by the satellite's transponder, the operation of which is illustrated in the simplified schematic drawing of FIG. 2. The transponder's incoming signal is passed to a bandpass input multiplexer filter (IMUX), typically amplified by a travelling wave tube amplifier (TWTA) and filtered again by a bandpass output multiplexer filter (OMUX). A transponder contains other components as well, such as up- and down-converters. The transponder output signal travels to a plurality of receivers. One such receiver amplifies the signal through a low-noise amplifier (LNA), I/Q demodulates the amplified signal to yield the complex receive signal. The receive signal is typically provided to a receive filter (typically a PSF) that outputs the received symbols. When referring to a transmission link in the following, the structure shown in FIG. 1 is referred to.

In the absence of channel distortion and noise, the receive signal is equal to the transmit signal. On a transmission link of practical use, however, channel non-linearities change the phase and amplitude of the transmit signal as it passes through the transmission link, and thus generate distortion.

The non-linearities of the transmission link can be modelled by an AM/AM and AM/PM curve, where AM and PM refer to the magnitude and phase of a complex signal, respectively. The AM/AM curve returns the magnitude of the receive signal versus the magnitude of the transmit signal and the AM/PM curve returns the phase rotation of the transmit signal incurred during amplification in the transmission link versus the magnitude of the transmit signal. The absolute phase of the receive signal thus equals the phase of the transmit signal plus the phase rotation applied by the channel. These AM/AM and AM/PM curves are often normalised, such that the saturation point (i.e. the maximum) of the AM/AM curve is (1,1). The ordinate and abscissa of such normalized curves are then the inverses of the output backoff ($OBO_{lin}$) and input backoff ($IBO_{lin}$) of the on-board TWTA, respectively. The subscript lin refers to the fact that here these values are shown in linear scale. An example of AM/AM and AM/PM curves is given in FIG. 3.

The distortion caused by the non-linearities is best illustrated by plotting the location of the received symbols, which is referred to as a scatter plot at the receiver side (in the following, simply denoted as a "scatter plot"). The distortion mainly has two consequences:

(1) in a scatter plot, each constellation point becomes a cluster, caused by inter-symbol interference (ISI) due to the memory in the channel, and (2) constellation warping occurs, which causes the mass points of the clusters to be no longer on the original constellation grid.

Such a scatter plot for the channel given in FIG. 3 and for 16-APSK rate 2/3 from the DVB-S2 standard is illustrated in FIG. 4. Note that no noise is added and only channel distortion is taken into account.

Techniques to mitigate the distortion effects, caused by the satellite transponder, by manipulating the signal in the transmitter are generally referred to as predistortion. It is important to distinguish satellite TWTA predistortion from ground station HPA predistortion. The main difference is that the wireless link towards the TWTA should comply with a spectral mask which limits the occupied bandwidth of the signal. When referring to predistortion in this text, satellite TWTA predistortion is meant. Predistortion can yield significant gains and is thus highly valuable in satellite communications, especially because one predistorter in the hub, can improve the performance of millions of terminals receiving the signal from one satellite transponder. The first publications on predistortion date from the 1970s (see amongst others "*Modeling and Performance Evaluation of Nonlinear Satellite Links-A Volterra Series Approach*", Benedetto, Biglieri, and Daffara, IEEE Tr. on Aerospace and Electronic Systems, Vol. AES-15, No. 4, pp. 494-507, July 1979 and "*Adaptive Cancellation of Nonlinear Intersymbol Interference for Voiceband Data Transmission*", Biglieri, Gersho, Gitlin, Leong Lim, IEEE J. Sel. Areas In Comm., Vol. SAC-2, No. 5, pp. 765-777, September 1984). Early and recent publications focussed especially on a Volterra series representation of the non-linear channel. In general, prior art predistortion techniques introduce a unit in the transmitter that generates "anti-distortion" for the distortion caused by the channel. The combination of the distortion from the channel and the "anti-distortion" generated at the transmitter ideally should minimize the overall distortion at the receiver. The most relevant techniques can be classified in two categories: signal predistortion (also known as fractional predistortion or sample-level predistortion) and symbol predistortion (a.k.a. data predistortion). Symbol predistortion aims at subtracting from the transmitted symbols the interference expected at the receive side. This can for example be done by (statically or dynamically) computing a new constellation from which the transmitted symbols are selected, while maintaining the original constellation for demapping at the receiver. The new constellation can for example be a non-linear transformation of the original constellation (in the case of static symbol predistortion). Signal predistortion aims at performing the inverse operation of the transmission link on the signal provided by the PSF. Ideally, the inverse operation of the transmission link and the transmission link itself are applied consecutively on the transmit signal, as illustrated in FIG. 5. In the ideal case the corresponding overall AM/AM and AM/PM curves of the cascade of the predistortion unit and the transmission link are those of a hard-limiter channel, as shown in FIG. 6.

However, performing the inverse operation of the channel on the signal provided by the PSF is a non-linear operation and causes spectral regrowth, i.e., the occupied frequency bandwidth of the transmit signal becomes larger. Until very recently, signal predistortion was thought not to be applicable for satellite communications, because the spectral regrowth does not comply with the spectral mask on the transmit signal. For example, it is explicitly mentioned that fractional predistortion cannot be used in satellite communications in U.S. Pat. No. 6,963,624B1 and in the papers "*Constellation Design for Transmission over Nonlinear Satellite Channels*" (Montorsi et al., IEEE Global Communications Conference (GLOBECOM), pp. 3401-3406, December 2012) and "*Joint precoding and predistortion techniques for satellite telecommunication systems*" (M. Álvarez-Diaz et al., Int'l Symposium on Wireless Communication Systems, September 2005, pp. 688-692).

High performance symbol predistortion is complex in logic and/or memory, especially for higher order constellations. In most of the literature it is argued that constellations larger than 32-APSK cannot be predistorted using symbol predistortion.

Besides the above mentioned problems for signal and symbol predistortion, it was hard to estimate the unknown TWTA non-linear amplifier characteristics (see for example "*Adaptive Fractional Predistortion Techniques for Satellite Systems based on Neural Networks and Tables*", M. Berdondini et al., Vehicular Technology Conference, April 2007, pp. 1400-1404). For example, for signal predistortion the channel characteristics must be known in order to be able to apply the inverse of these channel characteristics on the transmit signal fed from the PSF.

For the above-mentioned reasons predistortion was not much applied in satellite communications, despite it being a relatively long studied problem. Only recently, some prior art techniques, disclosed for example in WO02/73920 and in international patent application PCT/EP2014/051947, have applied symbol predistortion in a memory-efficient way. Application WO2013/012912 proposes a solution to estimate the unknown TWTA characteristics.

In WO2013/012912A1 the TWTA characteristics are estimated during a calibration stage in which a transmitter sends a signal to a receiver. At the receiver the difference between the transmit signal (which is known through decoding and remodulation of the received signal) and corresponding receive signal is used to estimate the channel characteristics. The estimated channel characteristics are fed back to the transmitter as an input to the inverse channel model. This prior art solution is illustrated in FIG. 7.

However, an important problem remains to be solved. The estimated TWTA characteristics do not depend on the modcod, so the predistortion parameters used at the transmitter do not depend on the modcod either. As a consequence, non-linear predistortion is cumbersome to use in combination with ACM using the technique disclosed in WO2013/012912A1. That is, when the modcod changes dynamically while the predistortion unit is static, the predistortion unit will not be well parameterized anymore and even the output power of the modulator will change. Due to this changing output power, the ALC on the satellite might introduce level variations across the baseband frames with significant performance degradation as a consequence.

Consequently, there is a need for a predistortion unit that is compatible with ACM.

SUMMARY OF THE INVENTION

It is an object of embodiments of the present invention to provide for a structure capable of performing predistortion in a way that is compatible with adaptive code and modulation.

The above objective is accomplished by the solution according to the present invention.

In a first aspect the invention relates to a device for predistortion and pulse shaping filtering in a communication system comprising input scaling means arranged for scaling an applied transmit symbol with an adaptable input gain scaling factor, a pulse shaping filter and a predistortion unit arranged for applying on said input gain scaled transmit symbol in either order a filtering operation and a non-linear predistortion operation, so obtaining a predistorted signal, said non-linear predistortion operation represented by a set of parameter values selectable among a plurality of given sets of parameter values, said predistortion unit being arranged for selecting said set of parameter values exploiting a given performance measure, output scaling means arranged for scaling said predistorted signal with an output gain scaling factor, so obtaining a transmit signal, whereby said adaptable input gain scaling factor and said output gain scaling factor are precalculated values corresponding to at least the selected set of parameter values.

The proposed solution indeed allows for an improved performance. Due to the adaptable input gain scaling factor it is possible to account for the modcod that is actually applied. This is particularly advantageous in adaptive code and modulation mode, where the applied modcod regularly changes. Due to the dynamics in modcod, it is not possible to do a calibration for each modcod. Further, as set out in detail below, the adaptable input gain scaling factor allows fine-tuning depending on whether data symbols or pilot symbols are being transmitted.

The pulse shaping filter and the predistortion unit can be positioned in either order. When symbol predistortion is applied, the predistortion is performed on the mapped symbols. Next the predistorted symbols are fed to the pulse shaping filter. In the case of signal predistortion the transmit symbols are first input to the pulse shaping filter and next predistortion is applied.

Both the adaptive input gain scaling and the output gain scaling are performed using precalculated values. These values are taken from a list of possible values, whereby each value corresponds to a set of parameter values for the predistortion.

In a preferred embodiment the adaptable input gain scaling factor depends on the type of modulation and coding being applied. As already mentioned, this feature is especially useful in adaptive code and modulation mode. Furthermore, as a non-data symbol (e.g. a pilot symbol or a header symbol) has another modulation and coding than data symbols, the input gain scaling can also be adjusted when non-data symbols are transmitted, with advantages as detailed below.

Preferably the precalculated variable input gain scaling factor value is determined optimizing a metric in a given modulation mode. The metric is in one embodiment an error rate performance in constant code and modulation mode. In another embodiment the modulation mode is adaptive code and modulation and the metric is error rate performance for one modulation and coding type selected among a plurality of modulation and coding types, and constant modulator output power for the other modulation and coding types of said plurality. The selected modulation and coding type is advantageously the one with the largest spectral efficiency, which is referred to as the leading modcod.

In a further embodiment the output gain scaling factor is dependent on the type of modulation and coding being applied, so that constant modulator output power is provided in constant code and modulation mode.

In yet another embodiment the modulation mode is adaptive code and modulation mode and the output gain scaling factor is dependent on the selected modulation and coding type, typically the leading modcod.

In an advantageous embodiment the given performance measure for selecting the set of parameter values is the carrier-to-distortion power ratio.

In another aspect the invention relates to a method for efficient transmission of information over a non-linear channel. The method comprises:

performing a scaling on a transmit symbol with an adaptable input gain scaling factor, performing a pulse shaping filtering and a non-linear predistortion operation on the input gain scaled transmit symbol, thereby obtaining a transmit signal, said non-linear predistortion operation represented by a set of parameter values selected among a plurality of given sets of parameter values, whereby for_selecting the set of parameter values a given performance measure is exploited, performing a scaling of the transmit signal with an output gain scaling factor, whereby the adaptable input gain scaling factor and the output gain scaling factor are precalculated values corresponding to the selected set of parameter values.

In a preferred embodiment the selection of a set of parameter values is performed in a non-disruptive way without having to switch off the predistortion operation.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
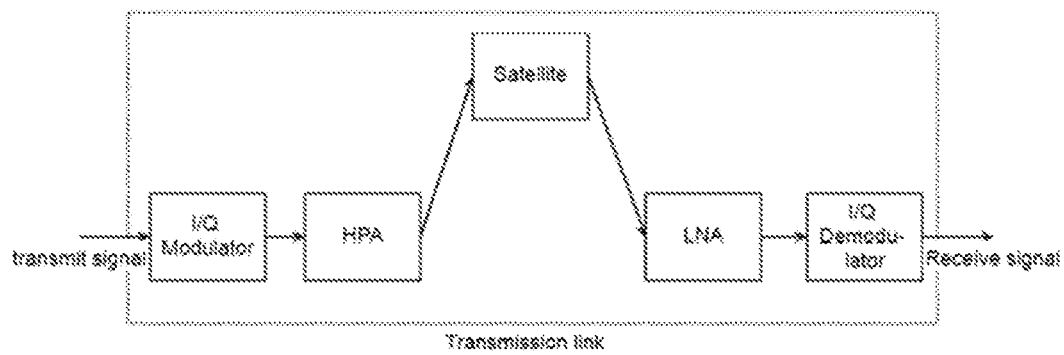
FIG. 1 illustrates a typical satellite communication link.
Figure 2:
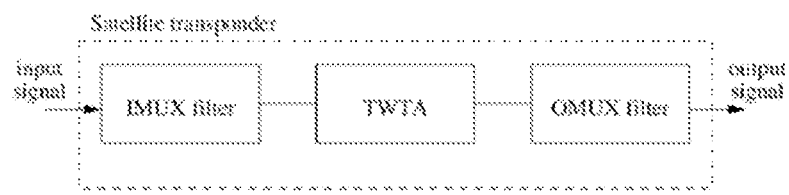
FIG. 2 illustrates a scheme of a satellite transponder.
Figure 3:
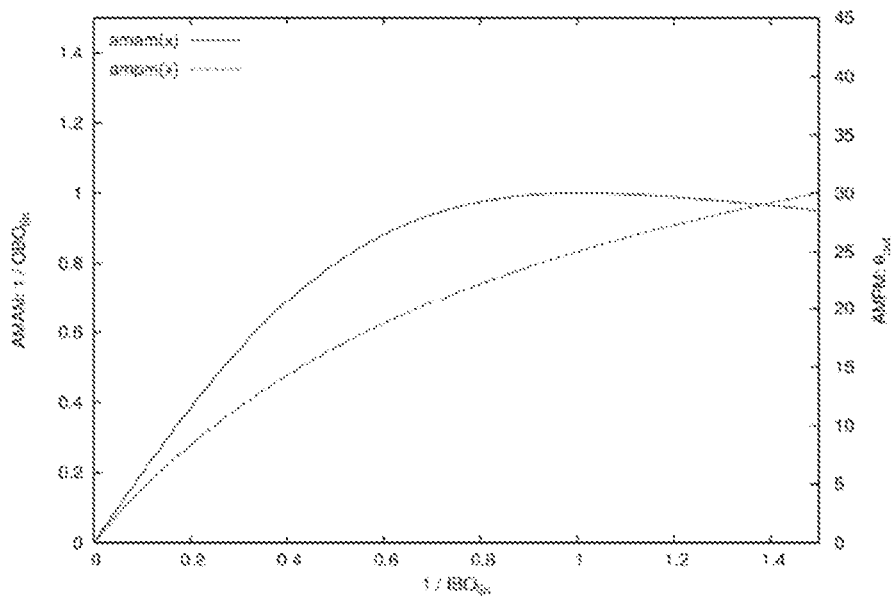
FIG. 3 illustrates the AM/AM and AM/PM curves of a channel.
Figure 4:
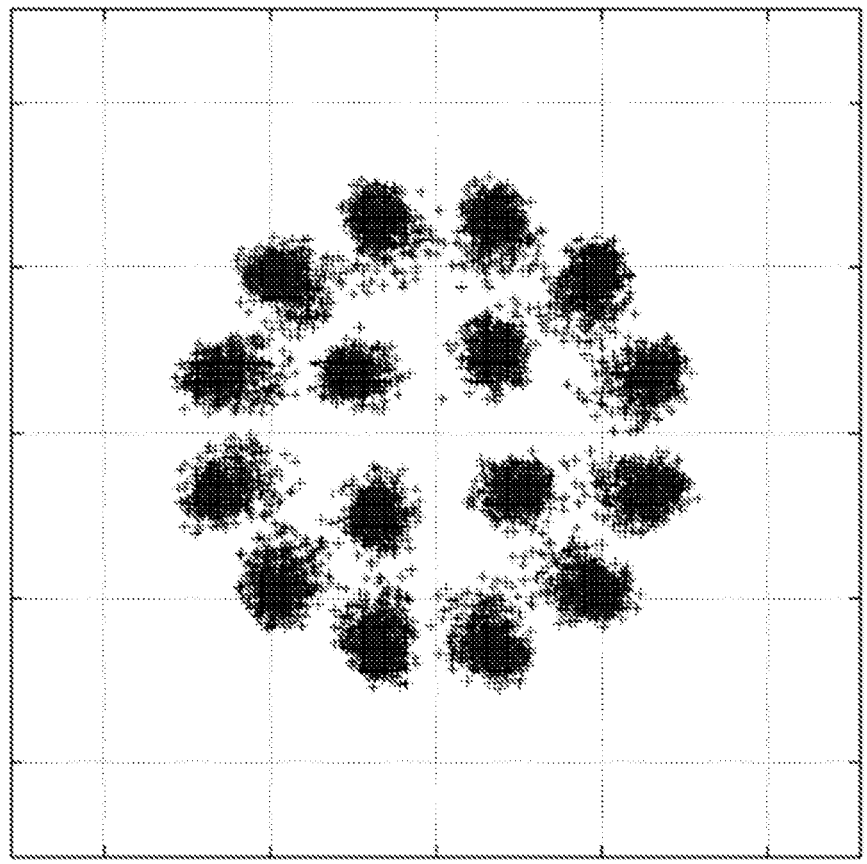
FIG. 4 illustrates a scatter plot for the channel of FIG. 3, whereby noise is discarded.
Figure 5:
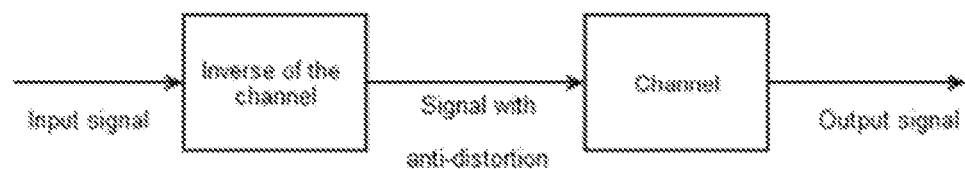
FIG. 5 illustrates an ideal implementation of a signal predistortion circuit. However, in satellite communications, such implementation cannot be used, because the bandwidth of the link between the predistortion unit and the transponder is limited.
Figure 6:
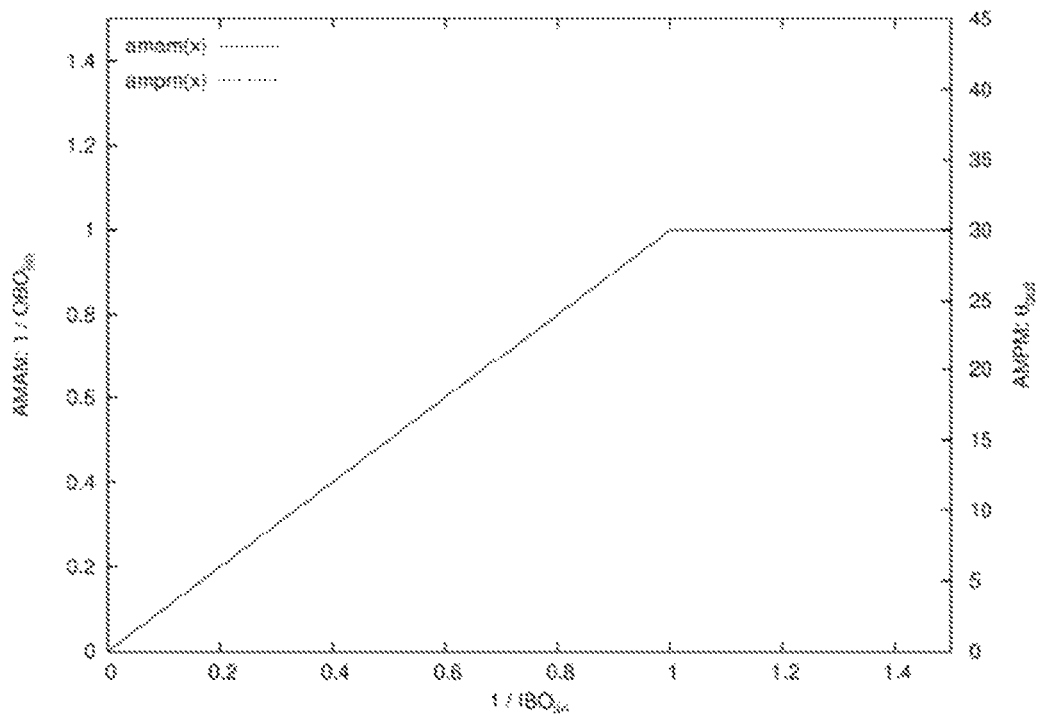
FIG. 6 illustrates the AM/AM and AM/PM curves of the concatenation of a predistortion unit and a channel in ideal circumstances (corresponding to FIG. 5), the concatenation representing a hard limiter channel.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The non-linear operation performed by the non-linear compensation filter in signal predistortion is considered here. Solutions for the spectral regrowth caused by the non-linear compensation filter, have gained little or no attention in the prior art, which is mainly the reason why this class of predistortion is almost never applied in satellite communications. A simple solution is proposed wherein a low-pass filter is used after the non-linear compensation filter to filter out the spectral regrowth. The low-pass filter can be a second PSF (which essentially is a low-pass filter) but is not limited to this.

Figure 8A:
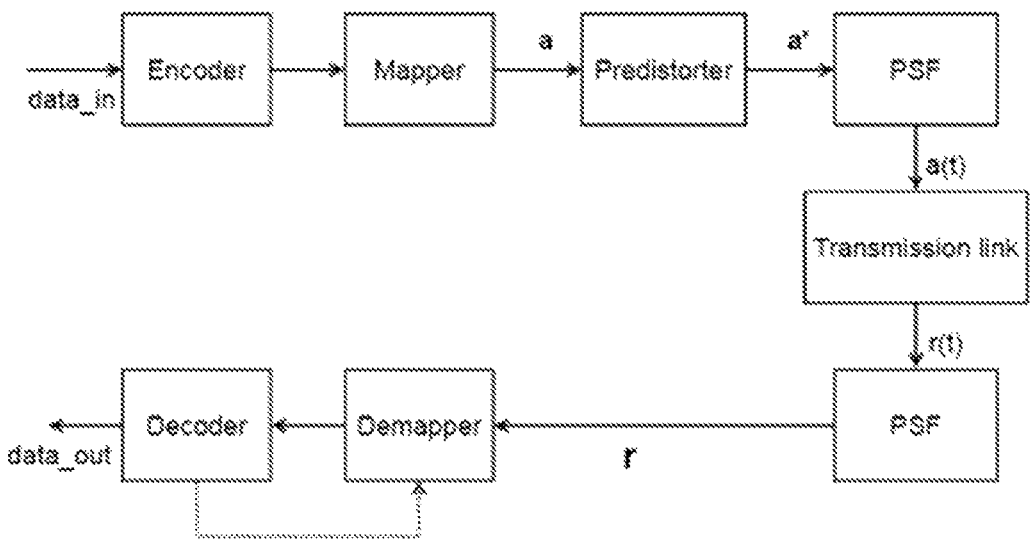
FIG. 8a and FIG. 8b illustrate a block scheme of a communication system for symbol and signal based predistortion, respectively.
Figure 8B:
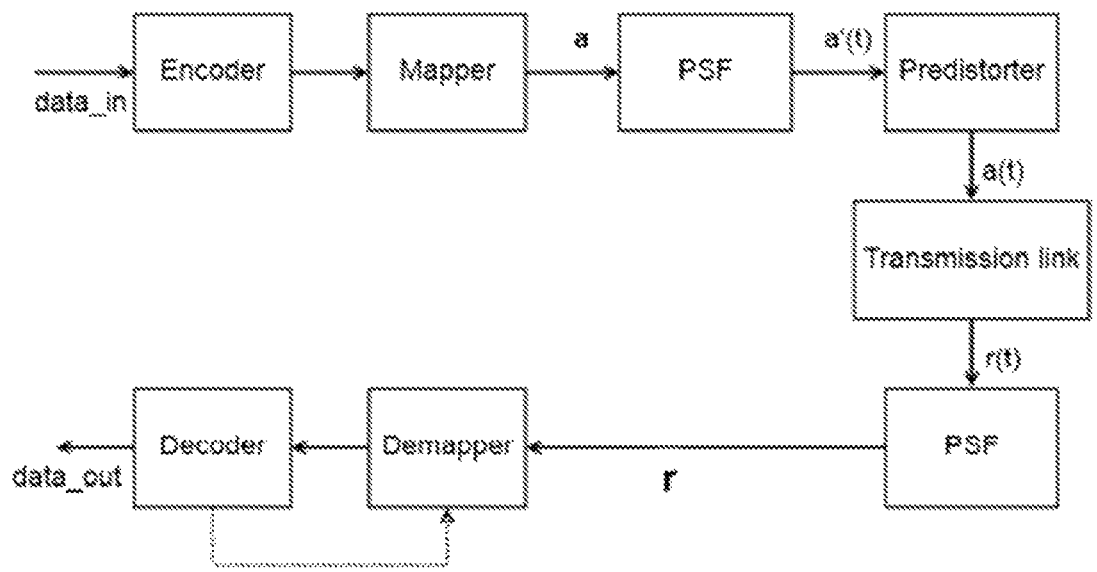

FIGS. 8a and 8b show example communication systems for symbol and signal predistortion, respectively. Incoming digital data, referred to as a sequence of information bits, is encoded with a forward error correcting code encoder. This encoder can be a single encoder, but can also be the concatenation of several encoders. The encoder output is a stream of coded bits which are mapped to symbols belonging to a certain constellation, such as PSK, APSK or QAM. This constellation is called the predefined constellation, as this is the constellation agreed upon by transmitter and receiver. The sequence of complex transmit symbols is denoted a. In the case of symbol predistortion, these constellation symbols are provided to a predistorter, yielding a'. The predistorted symbols are provided to the pulse shaping filter (PSF) and the transmit signal a(t) is provided to the transmission link (FIG. 1). In the case of signal predistortion, the transmit symbols a are fed to the PSF, followed by a predistortion unit yielding a(t), which is sent on the transmission link. At the receiver side, the receive signal r(t) is provided to the receive filter (which is typically a PSF) yielding the sequence of receive symbols r, which is demapped using the predefined constellation as a reference. The demapper outputs for example likelihood ratios of the coded bits, which are next fed to the decoder. Like the encoder, the decoder can be composed of one or more concatenated decoders. A person skilled in the art of digital receivers will readily understand that one or more decoders can process the received information in an iterative manner and one or more decoders can also exchange information with the demapper in an iterative fashion, as illustrated by the dashed arrow in FIG. 8.

In the receiver a level tracking loop is present to normalize and maintain the power level of the baseband frames. The aim is to let the mass points of the clusters, in a scatter plot with the received symbols, coincide with the predefined constellation. The level tracking loop typically uses non-data symbols (e.g. pilot symbols), to do this normalization. If the satellite is in ALC mode, also level tracking loops are present on the satellite, to maintain a given input backoff to the satellite TWTA transponder.

Figure 7:
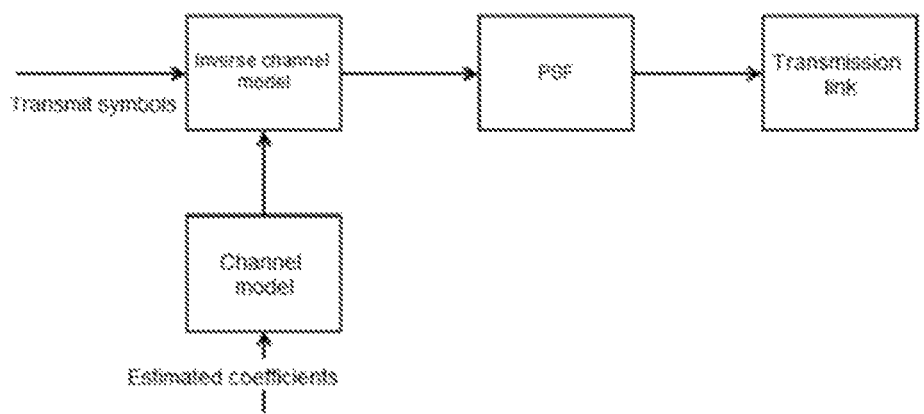
FIG. 7 illustrates the prior art solution disclosed in WO2013/012912.

It is recalled that in WO2013/012912A1 (FIG. 7) the channel parameters are estimated based on a calibration stage and fed back to the transmitter. In the transmitter the estimated channel parameters are used in the inverse of the channel model. The manipulation of the signal applied by the predistortion unit in this prior art solution remains identical when the modcod is changed. A first example of such change in modcod is when pilots are transmitted instead of data. As will be explained below, it can be beneficial to change the predistortion unit when pilots are transmitted, such that received symbols are amplified at the destination to reduce the effect of warping. This has direct benefits for a constant code and modulation (CCM) mode. A second example of changes in modcod is ACM, where the modcod is dynamically changed. In the conventional solution it would require a calibration for each modcod to determine parameters, which does not comply with the required dynamic behaviour of ACM. A static predistortion unit has the critical drawback of a non-constant modulator output power when the modcod changes dynamically. That is, the input backoff to the overall AM/AM and AM/PM curves (representing the concatenation of the non-linear filter, low-pass filter and channel filters) is not optimized for modcods that are not used in the calibration stage. The modulator output power changes when changing the modcod, which causes level variations between different baseband frames at the output of the modulator. Level tracking loops (e.g. the satellite ALC loop and the receiver tracking loop), which aim to normalize and maintain the power level over the baseband frames, will suffer from transition effects when switching from one frame to another. One of the consequences is degradation of the demapping block, as the received symbols will be compressed or amplified, deviating the symbols further from the predefined constellation used for demapping.

Figure 9:
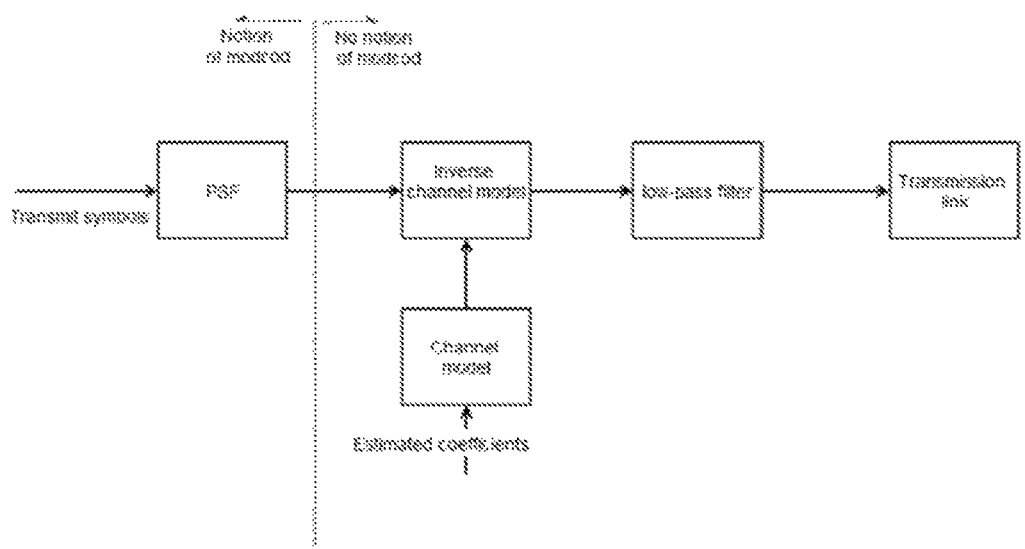
FIG. 9 illustrates the combination of the prior art solution disclosed in WO2013/012912 and signal predistortion.

The static predistortion unit of the conventional solution (WO2013/012912A1) for signal predistortion can be illustrated. When combining the solution from WO2013/012912A1 with signal predistortion (FIG. 8b), the scheme in FIG. 9 is obtained. As can be seen, the predistortion unit is completely in the signal domain where no notion of modcod is present.

Figure 10:
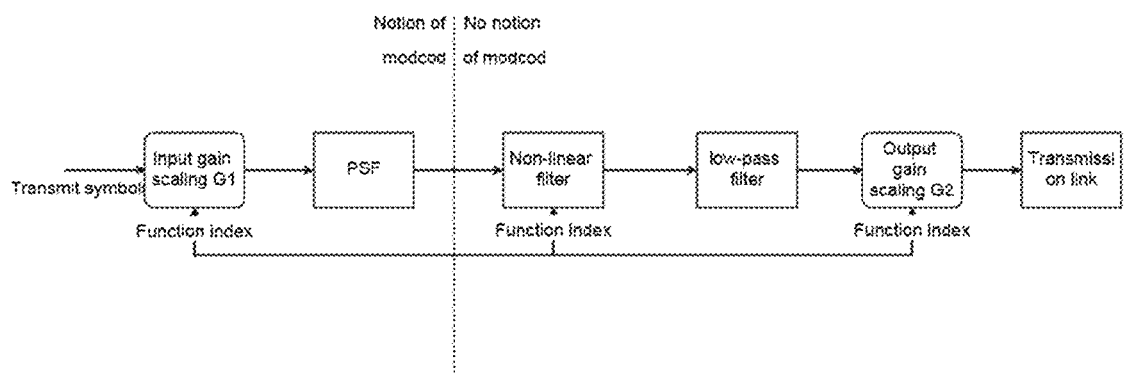
FIG. 10 illustrates an embodiment of the present invention.

The predistortion unit is now elaborated in detail for the case of signal predistortion. A block diagram of an embodiment of the present invention is shown in FIG. 10. This structure has two important differences with the structure in FIG. 9.

First, as opposed to FIG. 9, the predistortion unit according to the present invention does not simply apply an inverse function to the estimated channel model. In fact, it tries to find the optimal non-linear compensation filter adaptively. That is, a set of non-linear filters is considered such that a plurality of possible combinations of the low-pass filter and non-linear channels are well covered. As a result, after the parameter acquisition stage a suited non-linear filter can be applied, whereby the presence of the low-pass filter is taken into account. The parameter acquisition stage, which is in a preferred embodiment non-disruptive, is elaborated more in detail below.

Secondly, the predistortion structure according to the present invention applies a gain scaling before the PSF, where still a notion of modcod is present (thus where one can also distinguish between pilots and data). As mentioned above, the modcod-dependent gain scaling factor is essential for ACM and improves the performance in CCM. The gain scaling factor is denoted $G_1$. As such, the invention disclosed here solves the problems of the conventional solution, as detailed below.

In one embodiment the non-linear compensation filters used in the predistortion unit according to the present invention are given by the non-linear functions:

$A_{out} = 1 - (1 - A_{in})^{(1/\alpha)}$, if $A_{in} \leq 1$ $A_{out} = 1$, if $A_{in} \geq 1$ $\theta_{out} = -\alpha_2 * A_{out}^2 / (1 + \beta_2 * A_{out}^2) + \theta_{in}$ [degrees], where $A_{in} = |a'(t)|$ and $\theta_{in} = \arg[a'(t)]$ are the input magnitude and input phase of the non-linear compensation filter (or, equivalently, the output magnitude and output phase of the PSF; that is, a'(t) is the output signal of the PSF), respectively, and $A_{out} = |a(t)|$ and $\theta_{out} = \arg[a(t)]$ the output magnitude and output phase of the non-linear compensation filter, respectively, and where $\alpha_2 = \theta_{maxout} * \theta_{maxin} / (\theta_{maxin} - \theta_{maxout})$ $\beta_2 = \theta_{maxout} / (\theta_{maxin} - \theta_{maxout})$, where $\alpha$, $\theta_{maxim}$ and $\theta_{maxout}$ are parameters that can be freely chosen. In one embodiment the non-linear functions can be implemented through a look-up table (LUT).

The driver of the transmitter can program the LUT with different non-linear functions, depending on the parameters $\alpha$, $\theta_{maxin}$, and $\theta_{maxout}$. In another embodiment the hardware itself can perform the described functions. A sufficiently large set of combinations of $\alpha$, $\theta_{maxin}$, and $\theta_{maxout}$ is taken (i.e., the driver can program non-linear functions for all these combinations) to well represent all possible transponder characteristics present in the field.

Figure 11:
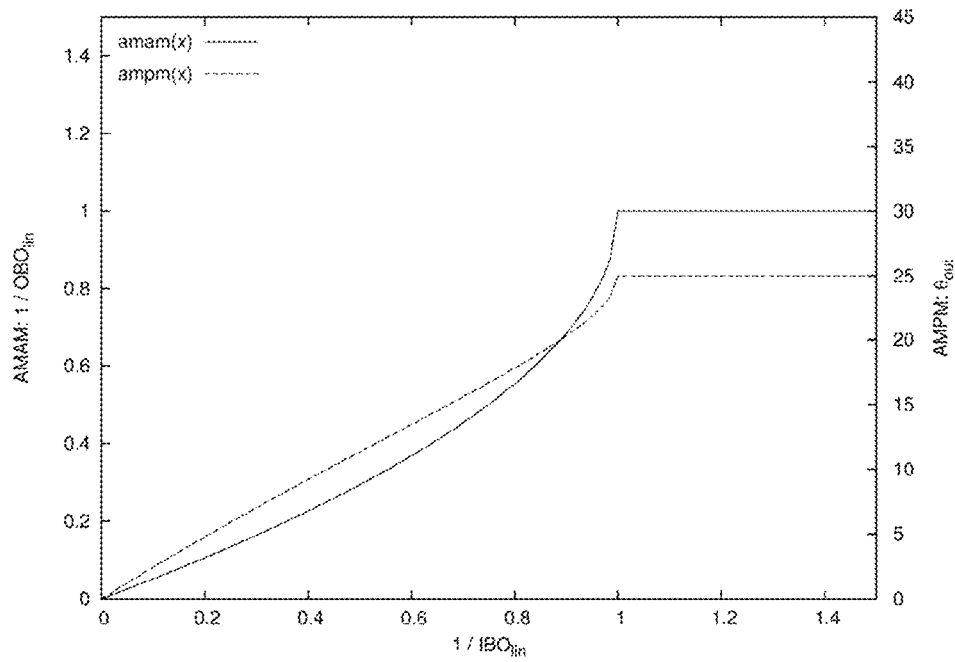
FIG. 11 illustrates the AM/AM and AM/PM curves of one function index of the predistortion block in one embodiment of the invention

An example for $\alpha=2$ (i.e., 6 dB), $\theta_{maxin}=25$ degrees and $\theta_{maxout}=50$ degrees is shown in FIG. 11 (for the AM/PM curve, $\alpha_2 * A_{out}^2 / (1 + \beta_2 * A_{out}^2)$ is shown). Note that the invention is in no way limited to the proposed non-linear compensation filters and other filters can be taken. For example, the inverse functions of common channel models, such as the Saleh channel model, the Ghorbani model, a Rapp model or an Hyperbolic Tangent model can be applied. A key difference with the conventional solution (FIG. 7) as disclosed in WO2013/012912A1, is that various possible parameter combinations of these models are considered but these parameters are not estimated through physical measurements of these parameters. Each combination of $\alpha$, $\theta_{maxin}$ and $\theta_{maxout}$ identified by a function index. For example, the combination $\alpha=2$ (i.e., 6 dB), $\theta_{maxin}=25$ degrees and $\theta_{maxout}=50$ degrees is one function index, e.g. function index 1. Another function index, say function index 2, can for example represent $\alpha=3$, $\theta_{maxin}=25$ degrees and $\theta_{maxout}=50$ degrees and yet another function index, say function index 3, can represent $\alpha=3$, $\theta_{maxin}=25$ degrees and $\theta_{maxout}=60$ degrees.

Given that the average symbol power equals one, the gain $G_1$ in FIG. 10 can be seen as the inverse of an input backoff to the $A_{out}$ vs $A_{in}$ curve. Thus, $1/IBO_{lin}$ in FIG. 11 equals $G_1$. For each function index the gains $G_1$ and $G_2$ are pre-computed off-line for a given metric.

In the case of CCM, $G_1$ and $G_2$ are pre-computed as follows. Given a function index and a modcod, the gain $G_1$ is chosen such that the frame error rate (FER) is minimized In another embodiment, the bit error rate or another metric can be minimized. Given a function index and a modcod, the gain $G_2$ is chosen such that the modulator output power is the same as without predistortion. In general, larger constellation sizes have a larger peak-to-average power ratio (PAPR) and require a higher carrier-to-distortion power, such that the gain $G_1$ must be smaller (corresponding to a larger input backoff) for these constellations. For example, consider the 16- and 64-APSK constellations, illustrated in FIG. 12a (the constellation is given by the big black dots) and FIG. 13. The 16- and 64-APSK constellations have a PAPR of 1.1 and 2.2 dB, respectively. Combining both constellations with the DVB-S2 FEC with coding rate 2/3, their optimal gain $G_1$ taking the FER as metric is −1.75 dB and −3.35 dB, respectively.

In the case of ACM, $G_1$ and $G_2$ are pre-computed as follows. Given a function index and a selected modcod (the selected modcod is advantageously the leading modcod, being the modcod in the ACM stream with the largest spectral efficiency, corresponding to the smallest gain $G_1$), the gains $G_1$ and $G_2$ are taken the same as in CCM mode. For example, when the leading modcod is 64-APSK with coding rate 2/3, then $G_1$=−3.35 dB. Given a function index and another modcod (say 16-APSK 2/3), the gain $G_2$ is maintained (because in ACM one cannot modify $G_2$ on a modcod basis, as there is no notion of modcod after the PSF) and the value of the gain $G_1$ is chosen such that the output power of the modulator remains constant with respect to the leading modcod (thus with respect to an operation without predistortion). For example, for 16-APSK 2/3 (with leading modcod 64-APSK 2/3), the G1 value to obtain a constant output power is −3.1 dB. Note that applying the gain of −3.35 dB would yield a different modulator output, which must be avoided.

The selected modcod is advantageously the leading one, i.e. the one with the largest spectral efficiency, corresponding to the smallest gain $G_1$. The gain $G_1$ for the other modcods depends on the gain $G_1$ of the leading modcod, and typically, the gain $G_1$ of the other modcods is close to the gain $G_1$ of the leading modcod. As a consequence, this small gain factor $G_1$ does not result in oversaturation for the other modcods (which would cause a significant performance degradation). As a consequence, given the function index and the modcod, all parameters can be pre-computed off-line. So it remains to determine the function index selection for a given transmission link, which is explained below.

Figure 12A:
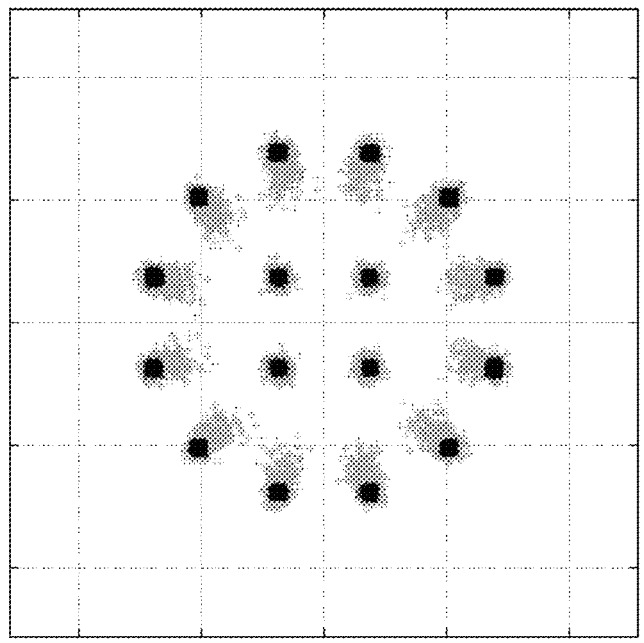
FIG. 12a illustrates a scatter plot when applying predistortion according to one embodiment of the invention, but without distinguishing data from non-data in the choice of the gain $G_1$.
Figure 12B:
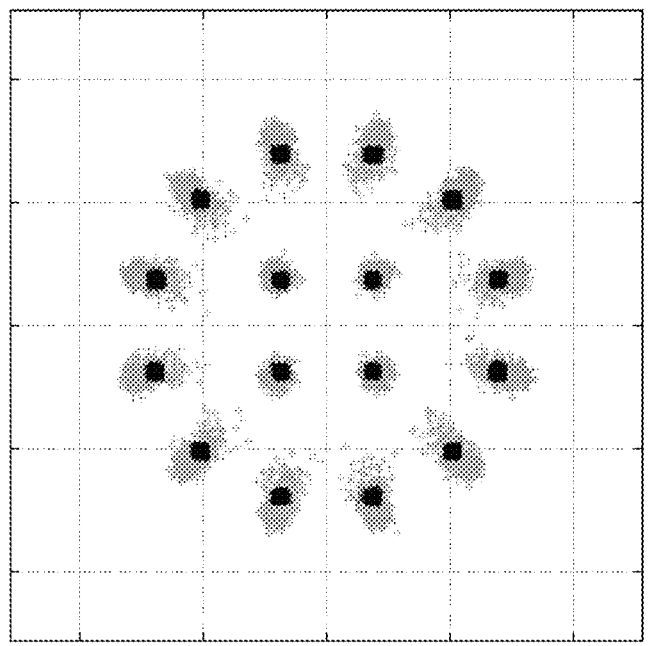
FIG. 12b illustrates a scatter plot when applying predistortion according to a preferred embodiment of the invention, distinguishing data from non-data in the choice of the gain $G_1$.
Figure 13:
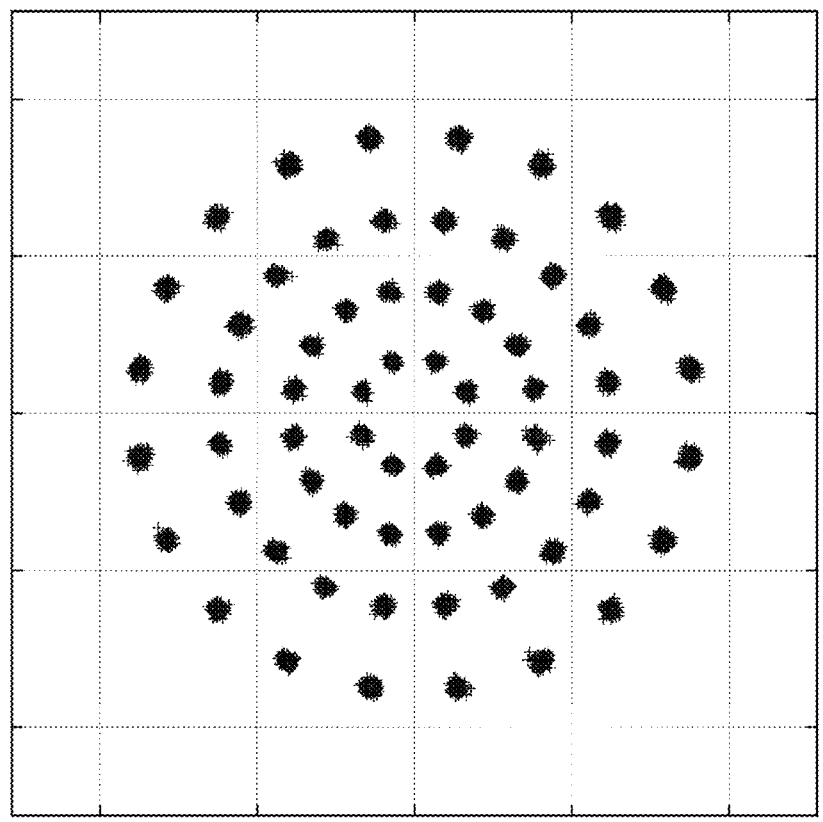
FIG. 13 illustrates a 64-APSK constellation with no or very little distortion.

In another preferred embodiment the gain $G_1$ is further fine-tuned off-line in case non-data symbols are sent (e.g. pilot symbols or header symbols). A state-of-the art receiver scales the received symbols such that the average power of the non-data symbols equals one. By transmitting the non-data symbols with an average power smaller than the average power of the data symbols, the receiver normalization results in an expansion of the overall constellation. This expansion reduces the warping effect. For the example taken above ($\alpha$=2 (i.e., 6 dB), $\theta_{maxin}$=25 degrees and $\theta_{maxout}$=50 degrees, 16 APSK rate 2/3), FIG. 12a shows the scatter plot when having the same $G_1$ for data and non-data symbols. FIG. 12b shows the scatter plot when $G_1$ is smaller for non-data symbols than for data symbols. It can be clearly seen that the mass points of the outer clusters (the received points are shown in gray) are closer to the constellation grid used for demapping (shown in black). The optimization of $G_1$ for non-data symbols separately yields a FER performance improvement up to 0.4 dB for the considered modcod (16-APSK 2/3).

The function index identifying, in one embodiment of the invention, the combination of the parameters $\alpha$, $\theta_{maxim}$ and $\theta_{maxout}$ to be applied, is determined in a parameter acquisition or parameter tracking phase as follows. In a preferred embodiment, this phase does not disrupt the ongoing traffic. Hence, in the case a transmission link is already operational, with predistortion switched on, it is preferred not to have to switch off predistortion. Unknown (in the case of a non-disruptive parameter acquisition or tracking phase) frames using the CCM modcod or the leading modcod in case of ACM are transmitted from the transmitter to a receiver. Besides through the satellite link, the transmitter and receiver may be connected to each other through another connection (e.g. because the receiver is co-located with the transmitter or because the receiver and transmitter are connected through a VPN network connection). At the receiver a performance measure is monitored. In a preferred embodiment this performance measure is the carrier-to-distortion power ratio (C/D). In other embodiments the modulation error rate (MER) or the bit error rate is measured. The MER is defined as the ratio of the root mean square power of the error vector to the power of the reference; the error vector is the difference between the received symbol vector and the corresponding transmitted symbol vector (e.g. obtained after successful decoding); the reference is the predefined constellation used for demapping. The transmitter chooses a first function index. Then other function indices are chosen. In the case that a transmission link is already operational and predistortion is already switched on (thus, the parameter tracking phase serves to track the channel parameters to verify whether the current predistortion function is still optimal), then this other function is a neighbouring function to the operational function, with very small performance difference. For each of the function indices, the receiver measures the performance. The function index with the best performance is selected as the function index generating the best anti-distortion compensating for the distortion generated by the concatenation of the low-pass filter and the satellite transponder. Note that the C/D as a performance measure is independent from downlink fading and noise, which may occur during the parameter acquisition phase.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device for predistortion and pulse shaping filtering in a communication system comprising:
   input scaling means arranged for scaling an applied transmit symbol with a configurable input gain scaling factor,
   a pulse shaping filter and a predistortion unit arranged for applying on said input gain scaled transmit symbol in either order a filtering operation and a non-linear predistortion operation, so obtaining a predistorted signal, said non-linear predistortion operation represented by a set of parameter values selectable among a plurality of given sets of parameter values, said predistortion unit being arranged for selecting said set of parameter values exploiting a given performance measure, output scaling means arranged for scaling said predistorted signal with an output gain scaling factor, so obtaining a transmit signal, whereby said configurable input gain scaling factor and said output gain scaling factor are precalculated values corresponding to at least the selected set of parameter values and said configurable input gain scaling factor depends on selected modulation and coding being applied.

2. The device as in claim 1, wherein said configurable input gain scaling factor depends on said transmit symbol being a data symbol or a pilot symbol.

3. The device as in claim 1, wherein said precalculated configurable input gain scaling factor value is determined optimizing a metric in a given modulation mode.

4. The device as in claim 3, wherein said metric is an error rate performance in constant code and modulation mode.

5. The device as in claim 3, wherein in adaptive code and modulation mode said metric is error rate performance for one modulation and coding type selected among a plurality of modulation and coding types, and constant modulator output power for other modulation and coding types of said plurality.

6. The device as in claim 5, where said selected modulation and coding type is the one with the largest spectral efficiency, said spectral efficiency defined as the number of information bits per symbol.

7. The device as in claim 1, where said output gain scaling factor is dependent on the type of modulation and coding being applied in constant code and modulation mode, so that constant modulator output power is provided.

8. The device as in claims 5, where in adaptive code and modulation mode said output gain scaling factor is dependent on said selected modulation and coding type.

9. The device as in claim 1, where said given performance measure for selecting said set of parameter values is the carrier-to-distortion power ratio.

10. A method for efficient transmission of information over a non-linear channel in a communication system, comprising:
performing, with an input scaling unit, a first scaling on an applied transmit symbol with a configurable input gain scaling factor,
performing in either order a pulse shaping filtering with a pulse shaping filter and a non-linear predistortion operation with a predistortion unit on said input gain scaled transmit symbol, thereby obtaining a predistorted signal, said non-linear predistortion operation represented by a set of parameter values selected among a plurality of given sets of parameter values, whereby for selecting said set of parameter values a given performance measure is exploited,
performing, with an output scaling unit, a second scaling of said predistorted signal with an output gain scaling factor, so obtaining a transmit signal,
whereby said configurable input gain scaling factor and said output gain scaling factor are precalculated values corresponding to at least the selected set of parameter values and said configurable input gain scaling factor depends on selected modulation and coding being applied.

11. The method as in claim 10, wherein said selecting of a set of parameter values is performed in a non-disruptive way without having to switch off said predistortion operation.

12. The method as in claim 10, wherein said given performance measure for selecting said set of parameter values is the carrier-to-distortion power ratio.

* * * * *